US006965903B1

(12) United States Patent
Agarwal et al.

(10) Patent No.: US 6,965,903 B1
(45) Date of Patent: Nov. 15, 2005

(54) TECHNIQUES FOR MANAGING HIERARCHICAL DATA WITH LINK ATTRIBUTES IN A RELATIONAL DATABASE

(75) Inventors: Nipun Agarwal, Santa Clara, CA (US); Fei Ge, San Jose, CA (US); Sivasankaran Chandrasekar, Palo Alto, CA (US); Ravi Murthy, Fremont, CA (US); Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 241 days.

(21) Appl. No.: 10/306,485

(22) Filed: Nov. 26, 2002

Related U.S. Application Data

(63) Continuation-in-part of application No. 10/260,138, filed on Sep. 27, 2002.

(60) Provisional application No. 60/424,543, filed on Nov. 6, 2002, provisional application No. 60/378,800, filed on May 7, 2002.

(51) Int. Cl.[7] .............................................. G06F 17/30
(52) U.S. Cl. ...................... 707/104; 707/103; 707/101; 707/102
(58) Field of Search ........................... 707/2, 100, 101, 707/1, 104, 3, 103, 102, 6

(56) References Cited

U.S. PATENT DOCUMENTS

| | | | |
|---|---|---|---|
| 5,295,261 A | 3/1994 | Simonetti | .................... 395/600 |
| 5,404,513 A | 4/1995 | Powers et al. | |
| 5,463,772 A | 10/1995 | Thompson et al. | |
| 5,467,471 A | 11/1995 | Bader | .......................... 395/600 |
| 5,680,614 A | 10/1997 | Bakuya et al. | |
| 5,724,577 A | 3/1998 | Exley et al. | ................. 395/611 |
| 5,734,887 A | 3/1998 | Kingberg et al. | ........... 395/604 |
| 5,974,407 A | 10/1999 | Sacks | |
| 6,003,040 A * | 12/1999 | Mital et al. | ............. 707/103 R |
| 6,055,544 A | 4/2000 | DeRose et al. | |
| 6,128,610 A | 10/2000 | Srinivasan et al. | |
| 6,141,655 A | 10/2000 | Johnson et al. | |
| 6,189,012 B1 * | 2/2001 | Mital et al. | ............. 707/103 R |
| 6,208,993 B1 | 3/2001 | Shadmon | |
| 6,236,988 B1 | 5/2001 | Aldred | |

(Continued)

FOREIGN PATENT DOCUMENTS

WO     WO 00/49533     8/2000

(Continued)

OTHER PUBLICATIONS

Josephine Cheng, et al., "IBM DB2 XML Extender, An end-to-end solution for storing and retrieving XML documents.," IEEE, 2000, ICDE '00 Conference, San Diego, Feb. 2000, 128 pages.

(Continued)

Primary Examiner—Jean M. Corrielus
(74) Attorney, Agent, or Firm—Hickman, Palermo, Truong & Becker, LLP

(57) ABSTRACT

Techniques for managing hierarchical data include managing a link table in a relational database. The hierarchical data includes data about a hierarchy of nodes related by multiple links. The link table includes first information, second information and link information, for each link. First information indicates a first node in the hierarchical data. Second information indicates a second node that is associated with the first node by the link. Link information indicates values for link attributes of the link between the first node and the second node, and does not indicate a value for any attribute of the first node alone or any attribute of the second node alone. The techniques support directing a single SQL statement to a path database object, constructed based on the link table, in order to obtain paths that satisfy a search on link attributes.

32 Claims, 6 Drawing Sheets

U.S. PATENT DOCUMENTS

| | | |
|---|---|---|
| 6,279,007 B1 | 8/2001 | Uppala |
| 6,370,537 B1 * | 4/2002 | Gilbert et al. ............. 707/101 |
| 6,470,344 B1 | 10/2002 | Kothuri et al. |
| 6,487,546 B1 | 11/2002 | Witkowski |
| 6,496,842 B1 | 12/2002 | Lyness |
| 6,571,231 B2 | 5/2003 | Sedlar ........................... 707/1 |
| 6,604,100 B1 | 8/2003 | Fernandez et al. |
| 6,611,843 B1 | 8/2003 | Jacobs |
| 6,636,845 B2 | 10/2003 | Chau et al. |
| 6,681,221 B1 | 1/2004 | Jacobs |
| 6,704,739 B2 | 3/2004 | Craft et al. |
| 6,704,747 B1 | 3/2004 | Fong |
| 6,718,322 B1 | 4/2004 | Brye ............................. 707/3 |
| 6,725,212 B2 * | 4/2004 | Couch et al. .................. 707/2 |
| 6,754,661 B1 | 6/2004 | Hallin et al. ................ 707/100 |
| 2002/0056025 A1 | 5/2002 | Qui et al. |
| 2002/0133484 A1 | 9/2002 | Chau et al. |
| 2002/0184401 A1 | 12/2002 | Kadel, Jr. et al. |
| 2003/0004937 A1 | 1/2003 | Salmenkaita et al. |
| 2003/0009361 A1 | 1/2003 | Hancock et al. |
| 2003/0065659 A1 | 4/2003 | Agarwal et al. |
| 2003/0084056 A1 | 5/2003 | DeAnna et al. |
| 2003/0101194 A1 * | 5/2003 | Rys et al. .................... 707/101 |
| 2004/0043758 A1 | 3/2004 | Sorvari et al. |
| 2004/0064466 A1 | 4/2004 | Manikutty et al. |
| 2004/0103282 A1 | 5/2004 | Meier et al. |
| 2004/0176958 A1 | 9/2004 | Salmenkaita et al. |
| 2004/0225680 A1 | 11/2004 | Cameron et al. |

FOREIGN PATENT DOCUMENTS

| | | |
|---|---|---|
| WO | WO 01/59602 A1 | 8/2001 |
| WO | WO 01/61566 A1 | 8/2001 |

OTHER PUBLICATIONS

R. Bourret, et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

S. Vorthmann, et al. "Beyond Schemas, Schema Adjuncts and the Outside World," Markup Languages, Online!, vol. 2, No. 3, Jun. 2000, pp. 1-8.

Mi-Ok Chae, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Hansrudi Noser, et al., "Dynamic 3D Visualization of Database-Defined Tree Structures on the WWW by Using Rewriting Systems," 2000, IEEE, XP-002262516, pp. 247-254.

Sushil Jajodia, et al., "Toward a Multilevel Secure Relational Data Model" ACM, 1991, 8393 SIGMOD Record, 20 (1991) Jun., No. 2, New York, US, XP 000364619, pp. 50-59.

Daniele Braga et al., "A Graphical Environment to Query XML Data with Query," Proceedings of the Fourth International Conference on Web Information Systems Engineering (WISE '03), 2003, IEEE, 10 pages.

Chakraborty, Krishnendu, "The XML Garbage Collector", The Source for Developers, Sun Developer Network Site XP-002297849, Mar. 2002.

Written Opinion, Application No. PCT/US03/35551 (8 pages).

Current claims in PCT/US03/35551, pp. 20-23.

Al-Khalifa, S. et al., "Structural Joins: A Primitive for Efficient XML Query Pattern Matching", Feb. 26-Mar. 1, 2002, Data Engineering, 2002. Proceedings. 18th International Conference, pp. 141-152.

Chen, Ruey-shun et al., "Developing an XML framework for metadata system", Trinity College Dublin, Proc. of the 1st Inter. Sympo. on Information and Communication, pp. 267-272.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

Written Opinion, Application No. PCT/US03/35552 (4 pages).

Current claims in PCT/US03/35552, amended claim 1.

* cited by examiner

410
RECEIVE AN SQL STATEMENT
DIRECTED TO THE PATH VIEW
INVOLVING LINK ATTRIBUTES OR PATH NAMES

420
CONSTRUCT THE PATH VIEW BASED ON THE
RESOURCE TABLE, LINK TABLE, AND
HIERARCHICAL INDEX

480
OPTIMIZE AND EXECUTE THE SQL STATEMENT
AGAINST THE PATH VIEW

490
RETURN ANY PATHS, NODES, LINKS, OR ATTRIBUTES
THAT RESULT FROM THE SQL COMMAND

TECHNIQUES FOR MANAGING HIERARCHICAL DATA WITH LINK ATTRIBUTES IN A RELATIONAL DATABASE

CROSS REFERENCE TO RELATED APPLICATION

This application claims benefit of Provisional Appln. Ser. No. 60/424,543 filed Nov. 6, 2002, the entire contents of which are hereby incorporated by reference as if fully set forth herein, under 35 U.S.C. § 119(e).

This application also claims benefit as a Continuation-in-part of application Ser. No. 10/260,138, filed Sep. 27, 2002 (hereinafter called "Agarwarl"), the entire contents of which are hereby incorporated by reference as if fully set forth herein, under 35 U.S.C. §120, which claims the benefit of U.S. Provisional Application No. 60/378,800, filed May 7, 2002.

This application is related to U.S. patent application Ser. No. 10/305,990, filed on Nov. 26, 2002.

FIELD OF THE INVENTION

The present invention relates to techniques for managing hierarchical data in a relational database, and, in particular, to techniques for managing in a relational database hierarchical data for a hierarchy of nodes and links between nodes in which the links have attributes that are independent of the nodes.

BACKGROUND OF THE INVENTION

In a database management system (DBMS), data is stored in one or more data containers. The term container is used to refer to any set of data that is processed as a set of one or more records, each record being organized into one or more fields. In relational database systems, the containers are called "relations" or "tables," the records are referred to as "rows," and the fields are referred to as "columns," and each table has a fixed number of columns. In an object-relational database a column can be associated with a complex type that is made-up of several attributes. The values that occupy each row of such columns are called objects, which are instances of the complex type associated with the column. Each attribute can itself be associated with a fundamental type, such as a string of one or more characters, an integer of a given size, or floating point number of a given precision, or can be associated with another complex type.

The relational and object-relational models for data are very powerful. In particular, queries can be made for retrieving and storing data in a relational database using a structured query language (SQL). An SQL statement is a command that explicitly describes what data is to be retrieved from or stored in the relational database system as a result of the statement, but leaves up to each system the mechanisms and sequence of operations for producing the desired result. Several database management systems that accept SQL statements are commercially available at the time of this writing.

Some data are naturally organized as hierarchies rather than as relational tables of rows with a fixed number of columns in each table. Hierarchies are well-known mathematical constructs. In general, a hierarchy is composed of nodes at multiple levels. The nodes at each level are each linked to one or more nodes at a different level. Each node at a level below the top level is a child node of one or more of the parent nodes at a level above. In a tree hierarchy, each child node has only one parent node, but a parent node may have multiple child nodes. In a tree hierarchy, a node that has no parent node linked to it is the root node, and a node that has no child nodes linked to it is a leaf node. A tree hierarchy typically has a single root node. Hierarchies are not naturally stored in relational databases, because, for example, hierarchies do not have a fixed number of children for each node, while a particular table does have a fixed number of columns.

For example, a flexible file system on a computer readable medium is often organized into a hierarchy of "folders," also called "directories." Each folder can contain any number of files that store data on a computer readable medium and any number of other folders. The folder that contains the files and other folders is the parent node of those files and folders. The files and other folders are the child nodes of that folder.

Also, data elements in the extensible markup language (XML) are arranged into a tree hierarchy. XML is widely used to store data and exchange data between independent applications. Each data element in XML may be composed of zero or more child elements. Each element also has an element name and zero or more additional element attributes.

While convenient for many purposes, searches on data organized by hierarchies, such as file systems and XML documents, are sometimes difficult to express. The expression of the search criteria and the manner to specify the form and order of the results may vary from one data system to another. It would be convenient to be able to use SQL statements to find the contents of interest that meet search criteria on the data elements in the hierarchy or their attributes.

In one approach, described in Agarwal, nodes in a hierarchy are stored in a node table in a relational database, and the parent-child relationships are stored in a hierarchical index that lists the child nodes from a given parent node. In systems that maintain a node table and a hierarchical index, SQL commands can be used to list the nodes that satisfy certain criteria. The nodes can be searched, or results can be presented, or both, in an order based on the relationships in the hierarchical index. The approach enables one to use an SQL query on a file system to find a particular folder or file that satisfies certain criteria on the folder or file attributes. For example, one can get the file names for all files that are owned by user Scott and were created between Jan. 1, 2001 and Jan. 10, 2001, assuming owner and creation dates are attributes of the files in the node table. In some circumstances, a path name for the selected file or folder can be constructed by searching the hierarchical index for the parent that lists the found node, or its ancestor, as a child.

While this approach works well for many kinds of data organized in tree hierarchies, the approach has some shortcomings. The above approach assumes one path per file. Therefore, path names cannot be readily determined in hierarchies with cycles, or in hierarchies that allow a child node to have multiple parent nodes. In cases where a child node may have more than one parent, there may be more than one path for the same file.

Also, the approach does not work well for links that have attributes that are independent of the nodes that the links connect. For example, the approach does not allow a user to form search criteria based on the values of the link attributes. The link attributes are not attributes of any of the nodes; and are therefore not contained in any of the tables used to support SQL queries in the above approach.

Based on the foregoing, there is a clear need for techniques to manage hierarchical data that do not suffer the above deficiencies. In particular, there is a need for techniques to manage hierarchical data that contains cycles. In particular, there is also a need for techniques to support relational queries that involve search criteria on link attributes that are independent of the attributes of the nodes that the links connect.

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF SUMMARY OF AN EMBODIMENT OF THE INVENTION

Techniques are described for managing hierarchical data in a relational database. The hierarchical data includes data about a hierarchy of nodes related by multiple links. The link table includes first node information, second node information, and link information, for each link. First node information indicates a first node in the hierarchical data. Second node information indicates a second node that is associated with the first node by the link. Link information indicates values for link attributes of the link between the first node and the second node, and does not indicate a value for any attribute of the first node alone or any attribute of the second node alone.

BRIEF DESCRIPTION OF THE DRAWINGS

The present invention is illustrated by way of example, and not by way of limitation, in the figures of the accompanying drawings in which like reference numerals refer to similar elements and in which:

FIG. 4 is a flow diagram that illustrates, at a high level, a method for using the path view relational database object of FIG. 3 to provide results for SQL statements, according to an embodiment;

DETAILED DESCRIPTION OF THE INVENTION

Techniques are described for managing hierarchical data in a relational database. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the following, embodiments of the invention are described in the context of managing a hierarchical file system in a relational database. However, the embodiments are not limited to this context. In other embodiments, other hierarchical data, such as an XML document, may be managed in the relational database.

Techniques for managing hierarchical data include managing a link table in a relational database. The hierarchical data includes data about a hierarchy of nodes related by multiple links. The link table includes first node information, second node information and link information, for each link. First node information indicates a first node in the hierarchical data. Second node information indicates a second node that is associated with the first node by the link. Link information indicates values for link attributes of the link between the first node and the second node, and does not indicate a value for any attribute of the first node alone or any attribute of the second node alone.

These techniques support directing a single SQL statement to a path database object, constructed based on the link table, in order to obtain paths that satisfy a search, such as a search on link attributes.

Example Hierarchical File System

Figure 1:
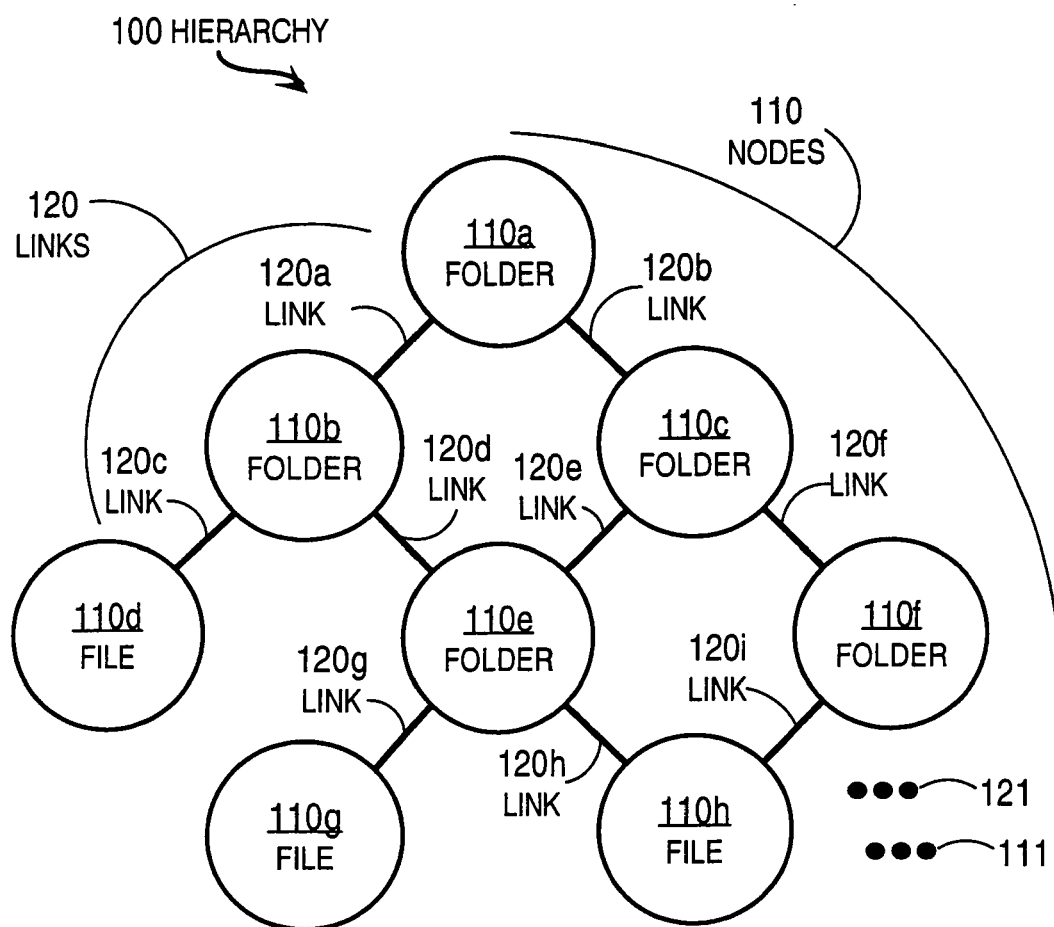
FIG. 1 is a block diagram that illustrates a hierarchy of nodes and links in a file system, according to an embodiment.

FIG. 1 is a block diagram that illustrates a hierarchy 100 of nodes and links in a file system, according to an embodiment. The hierarchy 100 includes multiple nodes 110 that each corresponds to a folder or a file in the file system. Nodes 110*a*, 110*b*, 110*c*, 110*e*, 110*f*, correspond to folders in the file system and are parent nodes to one or more other nodes; and nodes 110*d*, 110*g*, 110*h* correspond to files in the file system, which are always leaf nodes that are not parents to any other nodes. The term "resource" is used hereinafter to refer to an item that may be either a folder or a file; thus all nodes 110 correspond to resources. Ellipsis 111 indicates other nodes 110 in the hierarchy 100 that correspond to other resources in the file system.

Each node 110 has one or more attributes that correspond to properties of the corresponding resource. For example, node attributes may correspond to one or more of a resource name, a resource type (indicating whether file or folder, or indicating a file type or a folder type), a resource creation date, a resource modification date, a resource owner, a resource size, and a list of one or more resource authors, among other properties of the resource.

The nodes 110 are connected to other nodes 110 by links 120. A link 120 associates one node 110 with a different, single node 110. Link 120*a* associates parent node 110*a* with child node 110*b*. Similarly, links 120*b*, 120*c*, 120*d*, 120*e*, 120*f*, 120*g*, 120*h* and 120*i* associate one parent node 110 with one child node 110. Ellipsis 121 indicates other links 120 in the hierarchy 100 that correspond to one-to-one associations among other resources in the file system.

Each link 120 has one or more attributes that describe the association between the nodes that the link connects. For example, link attributes may correspond to one or more of a link name, a link type (indicating, for example whether the link represents a parent-child relationship or another relationship, such a sibling relationship, a grandparent-grandchild relationship, or an aunt-niece relationship), a link creation date, a link modification date, a link owner, a link owner type (e.g., a soft link with only one owner who creates or deletes the child, or a hard link with multiple owners any of whom may create and all of whom must delete the child), and a link descriptive text, among other properties of the link.

In many file systems, all links are implied. The implied links are of the same types (e.g., parent-child soft links), have no names independent of the nodes, and do not have any attributes, or all have the same attributes.

A path represents a sequence of links from one node (start node) to another node (finish node) in the hierarchy. Any method known in the art to specify the path may be used. Often, a path is specified by a path name that lists the links between the start node and the finish node. In many file systems, a path name is constructed by combining link names of the links, separated by a delimiting set of one or more special characters, in the order of traversal from start node to finish node. Often the start node is the root node of the hierarchy. For example, a path from folder 110a to file 110d is given by the path name:

/L120a/L120c where LX denotes the name of the link "X", where X is replaced by the numeral representing the link in FIG. 1; and the character "/" is used to delimit the link names. In file systems that employ implied links, or, at least, implied link names, the name of the parent node and the child node associated with the link is used instead of the link name. In a path name, the name of an intermediate node along the path is not repeated for its role as the child in one link and the parent in the next link, but is used only once. In such a file system, the path from folder 110a to file 110d is given by the path name:

/N110a/N110b/N110d where NY denotes the name of the node "Y", where Y is replaced by the numeral representing the node in FIG. 1.

A path is useful as output from the relational database system, because resources in different folders can have the same name, and those resources are distinguished by the paths leading to them. The file system retrieves data (such as data in a file or lists of files in a folder) from the resource uniquely specified by the path.

As shown in FIG. 1, in some hierarchies, there may be more than one path leading to the same node. For example, three paths lead to file 110h from the root node 110a:

/L120a/L120d/L120h/
/L120b/L120f/L120i/
/L120b/L120e/L120h/

Hierarchies in which more than one path leads to a child node are said to include cycles. Such hierarchies are represented as graphs rather than as trees.

Tables For The Example Hierarchicy

Figure 2:
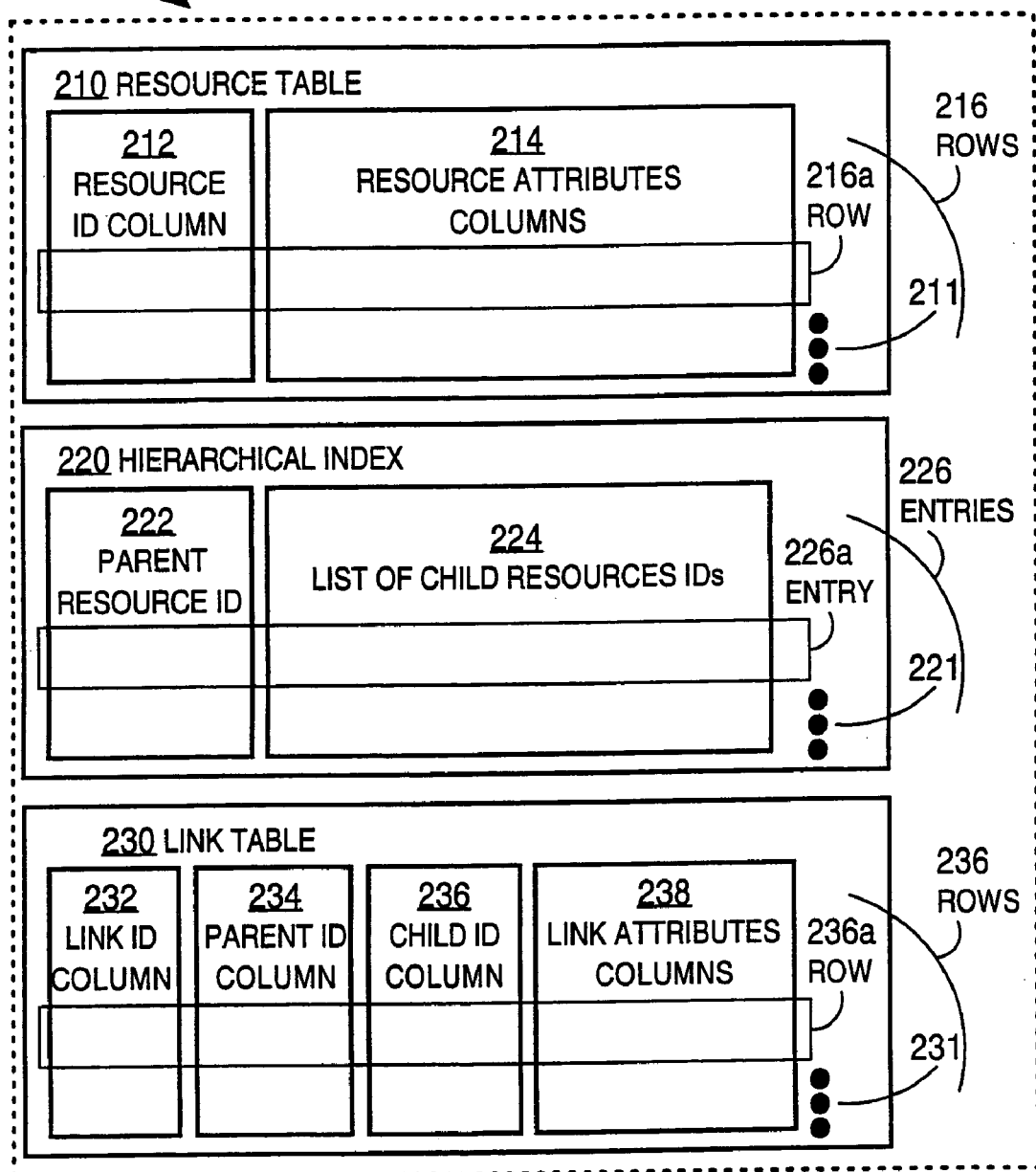
FIG. 2 is a block diagram that illustrates a relational database for storing a hierarchy, according to an embodiment.

According to the illustrated embodiments, the hierarchy of FIG. 1 is managed in a relational database system. FIG. 2 is a block diagram that illustrates a relational database 200 established in a relational database system for storing a hierarchy, according to the illustrated embodiment. Database 200 includes three relational database objects, a node table (called a "resource table" 210 in the illustrated embodiment), a hierarchical index 220, and a link table 230. The resource table 210 and the hierarchical index 220, for some embodiments, are described in Agarwal.

The node table holds data for the nodes 110 in the hierarchy. In the illustrated embodiment, the node table (resource table 210) holds data that indicates a resource identification (resource ID) and one or more resource attributes for all the resources in the hierarchy. The resource ID is a unique identification for each resource in the file system. Values for the resource ID are stored in the Resource ID Column 212. The resource attributes are one or more attributes of the nodes that correspond to the properties of the resources. Values for the resource attributes are stored in one or more Resource Attribute Columns 214. The resource table 210 includes rows 216. Row 216a holds specific values for the columns 212, 214 that are appropriate for one resource; other rows, indicated by ellipsis 211, hold values for the columns 212, 214 that are appropriate for other resources. In other embodiments, other database objects may be used to serve the function of the node table.

The hierarchical index 220 holds data that indicates a list of zero or more child nodes of each parent node. In the illustrated embodiment, the hierarchical index 220 holds data 222 that indicates the parent resource ID and data 224 that indicates a list of child resource IDs. The data structure in the illustrated embodiment is an index that can be rapidly searched for a particular value of the parent resource ID and that can efficiently store in sequential blocks of storage a variable number of items corresponding to the child resource IDs associated with the value of the parent resource ID. The hierarchical index 220 includes entries 226. Entry 226a holds specific values for the data 222, 224 that are appropriate for one parent resource; other entries, indicated by ellipsis 221, hold values for the data 222, 224 that are appropriate for other parent resources.

In other embodiments, other database objects may be used to serve the function of the hierarchical index. For example, a table may be used in which the data 222 indicating the parent resource ID is stored in one column and the data 224 indicating the list of child resources is expressed as a reference stored in a second column. The reference indicates another database object, or a data item therein, where the list of values of the child resource IDs is stored.

Using the node table and hierarchical index, a relational database system allows a user to search for resources based on criteria on the attributes of the resources, using SQL statements. Also, using implied links in a hierarchy that allows only one parent node per child node, a unique path from a root node may be specified. The unique path is specified by finding a parent in the hierarchical index that lists the returned resource as a child, and then finding a grandparent that lists the parent as a child, until the root node is reached. However, this approach to constructing the path is inefficient because, for each child, every child resource listed for every parent resource must be inspected until one parent is found that lists that child, then the parent is made the child and the search is performed again. The search is repeated at every level until the parent is the root node or the start node.

The Link Table

According to the illustrated embodiment, a link table 230 is included in database 200. The link table 230 holds data for the links 120 in the hierarchy. In the illustrated embodiment, the link table 230 holds data that indicates a link identification (link ID), a first resource ID for a first resource, a second resource ID for a second resource associated with the first resource by the link, and one or more link attributes, for all the links in the hierarchy. In the illustrated embodiments, the second resource is a child of the first resource, but in other embodiments, other relationships may associate the first and second resources.

The link ID uniquely identifies the link. Values for the link ID are stored in the Link ID Column 232. Values for the first resource ID (e.g., the parent resource ID) are stored in a first column (e.g., Parent ID Column 234). Values for the second resource ID (e.g., the child resource ID) are stored in a second column (e.g., Child ID Column 236). The link attributes are one or more attributes of the links that do not correspond to the properties of either of the resources associated by the link. Values for the link attributes are stored in one or more Link Attribute Columns 238.

The link table 230 includes rows 236. Row 236a holds specific values for the columns 232, 234, 236, 238 that are appropriate for one link; other rows, indicated by ellipsis 231, hold values for the columns 232, 234, 236, 238 that are appropriate for other links. In other embodiments, other database objects may be used to serve the function of the link table.

Using the link table with the node table and hierarchical index, a relational database system allows a user to search for resources or links, based on criteria on the attributes of the links as well as on the attributes of the resources, using SQL statements. Also, paths can be specified without using implied links or restricting the hierarchy to one parent per child. However, the approach described above for constructing the path is even more inefficient with multiple parents. Now, for each child, every child resource listed for every parent resource must be inspected even after one parent is found, because the child might have more than one parent. This tedious process is repeated for every level of the hierarchy above the child until the root node, or start node, is reached.

The Path View

Figure 3:
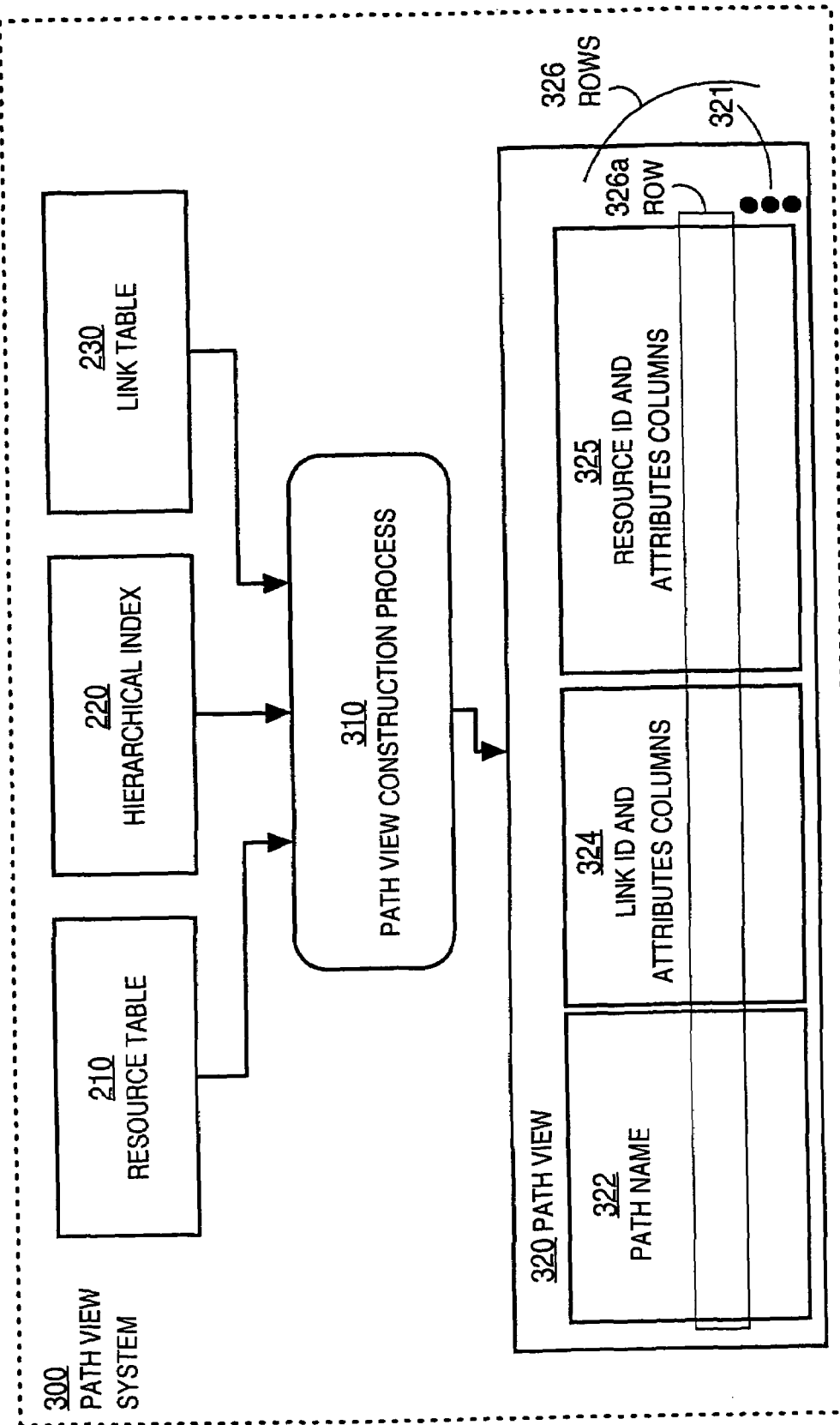
FIG. 3 is a block diagram that illustrates a system for providing a "path view" relational database object that includes links and paths for a hierarchy, according to an embodiment.

To make more efficient the construction of paths to resources for results of searches that satisfy SQL statements, a path view relational database object is generated, according to the illustrated embodiment. FIG. 3 is a block diagram that illustrates a path view 320 that includes links and paths for a hierarchy, and a system 300 for providing the path view, according to the illustrated embodiment.

System 300 includes the resource table 210, hierarchical index 220, and link table 230, described in the previous sections. System 300 also includes a path view construction process 310 and the Path View 320, a relational database object. The path view construction process 310 is described in more detail in a later section with reference to FIG. 5.

A view is a relational database object that is similar to a table in that data are organized into columns and rows. However, a view is different in that the data in a view is based on one or more underlying tables, called base tables. Therefore a view can be formed when desired by operating on the base tables. In some embodiments, a view is simply a stored set of one or more SQL statement that is executed when a user directs a user SQL statement to the view. The stored set of SQL statements are combined with the user SQL statement to produce a resultant set of rows and columns that satisfy the combined statements. In some embodiments, the view is a stored procedure written in a procedural language. The procedure may generate one or more SQL statements or invoke one or more stored SQL statements, as well as execute other, non-SQL commands. In some embodiments, the time to generate the view rows and columns is sufficiently significant that the rows and columns are pre-computed, according to a schedule or in response to a certain event, and stored in a table called a materialized view, for ready access by a user.

The rows and columns in the Path View 320 are illustrated in FIG. 3. The Path View 320 holds data for the paths in the hierarchy. In the illustrated embodiment, the Path View 320 holds data that indicates a path name, link identification and attributes, and resource identification and attributes.

The path name uniquely specifies one path through the hierarchy. Values for the path name are stored in the Path Name Column 322. Values for the link identification and attributes, for the last link in the path, are stored in one or more link ID and attribute columns 324. Values for the resource identification and attributes, for the child resource of the link, are stored in one or more resource ID and attribute columns 325. In some embodiments only the link ID is stored in columns 324 because the corresponding link information can be retrieved from the link table 230 using the link ID. In the illustrated embodiment, the Path View includes the link attributes in the columns 324 to avoid performing another table join when the SQL statement directed to the Path View includes a predicate on a value of a link attribute. Similarly, in some embodiments only the resource ID is stored in columns 325. In the illustrated embodiment, the Path View includes the resource attributes in the columns 325.

The Path View 320 includes rows 326. Row 326a holds specific values for the columns 322, 324, 325 that are appropriate for one path; other rows, indicated by ellipsis 321, hold values for the columns 322, 324, 325 that are appropriate for other paths. In other embodiments, other database objects may be used to serve the function of the Path View.

Table 1, lists the contents of an example Path View for the file system hierarchy 100 illustrated in FIG. 1. It is assumed, for purposes of illustration, that among many link attributes is the link attribute "creation_date" for holding the link creation date, and that among many resource properties is the resource property "owner" for holding the owner of the resource.

TABLE 1

Example Path View Contents

| Row # | Path Name | Link ID | Link Attributes ... creation_date ... | Resource ID | Resource Attr. ... owner ... |
|---|---|---|---|---|---|
| 1 | /L120a | ID120a | ... Jun. 1, 1999 ... | ID110b | ... Alice ... |
| 2 | /L120b | ID120b | ... Jul. 2, 1999 ... | ID110c | ... Scott ... |
| 3 | /L120a/L120c | ID120c | ... Sep. 3, 1999 ... | ID110d | ... Alice ... |
| 4 | /L120a/L120d | ID120d | ... Nov. 4, 1999 ... | ID110e | ... Bob ... |
| 5 | /L120b/L120e | ID120e | ... Jan. 11, 2000 ... | ID110e | ... Bob ... |
| 6 | /L120b/L120f | ID120f | ... Mar. 6, 2000 ... | ID110f | ... Scott ... |
| 7 | /L120a/L120d/L120g | ID120g | ... Apr. 7, 2000 ... | ID110g | ... Carol ... |

TABLE 1-continued

Example Path View Contents

| Row # | Path Name | Link ID | Link Attributes ... creation_date ... | Resource ID | Resource Attr. ... owner ... |
|---|---|---|---|---|---|
| 8 | /L120b/L120e/L120g | ID120g | ... Apr. 7, 2000 ... | ID110g | ... Carol ... |
| 9 | /L120a/L120d/L120h | ID120h | ... Jun. 1, 2000 ... | ID110h | ... Scott ... |
| 10 | /L120b/L120e/L120h | ID120h | ... Jun. 1, 2000 ... | ID110h | ... Scott ... |
| 11 | /L120b/L120f/L120i | ID120i | ... Jul. 11, 2000 ... | ID110h | ... Scott ... |

In Table 1, IDX denotes the link ID of the link "X", where X is replaced by the numeral representing the link in FIG. 1. IDY denotes the resource ID of the resource "Y", where Y is replaced by the numeral representing the resource in FIG. 1.

As shown in Table 1, two paths lead to resource 110e, which is owned by Bob; those paths are listed in Table 1 in rows 4 and 5. As also shown in Table 1, three paths lead to resource 110h, which is owned by Scott; those paths are listed in Table 1 in rows 9, 10 and 11.

In the illustrated embodiment, the Path View 320 is generated when desired by the path view construction process 310 based on the base tables (resource table 210 and link table 230) and the hierarchical index 220.

Using the Path View, a relational database system allows a user to search for resources based on criteria imposed on the attributes of the links as well as on the attributes of the resources, using SQL statements. Also, paths can be specified without using implied links or restricting the hierarchy to one parent per child. The paths in the Path View are generated efficiently, because they are determined by following the hierarchical index in the forward direction, as described in more detail in a later section with reference to FIG. 5.

For example, the following query (Q1) expressed in SQL can be easily expressed and evaluated using the Path View 320.

SELECT path_name, resource_name

FROM PathView

WHERE link_properties.creation_date>01 Jan 00

AND resource_properties.owner=Scott

AND under_path ('/L120a')=1     (Q1)

The expression "under_path ('LX')" evaluates to true (=1), if a path name includes the link name LX. This SQL statement is a query for all path names and resource names where the resource belongs to Scott, the link to the resource was created after Jan. 1, 2000, and the path includes link 120a.

With the values given in Table 1 for an example Path View, the SQL statement Q1 is readily evaluated. The predicate "link_properties.creation date>Jan. 1, 2000"_b 2 00" is satisfied by rows 5–11. Of these, the predicate "resource_properties.owner=Scott" is satisfied by rows 6 and 9–11. Of these, the predicate "under_path('/L120a')=1" is satisfied only by row 9. The result of the SQL query Q1 is therefore the path name in row 9, i.e. "/L120a/L120d/L120h," and the resource name in row 9, i.e. "N110h." Note that the query Q1 requests the resource name, which is "N110h," not the resource ID, which is "ID110h." It is assumed, for purposes of illustration, that the resource name is among the other resource attributes included in columns 325 of the Path View 320.

In some embodiments, the predicate "under_path('/L120a')=1" is considered when the Path View is generated by the process 310 to save time, so that only paths that begin with "/L1200a" are generated.

Method for Supporting SQL Statements Using Path View

FIG. 4 is a flow diagram that illustrates, at a high level, a method 400 for using Path View 320 to provide results for SQL statements, according to an embodiment. Although steps are presented in FIG. 4, and other flow diagrams, in a particular order, in other embodiments the steps may be performed in a different order or overlapping in time.

In step 410, a database management system, such as a database server, receives an SQL statement directed to the Path View. The SQL statement involves link attributes or path names. The example SQL statement Q1 is directed to the Path View and involves both link attributes ("link_properties") and path names ("SELECT path_name"). In some embodiments, the SQL statement involves link properties or path names, like Q1, but is directed to one of the base tables, such as resource table 210, rather than to Path View 320. In some of these embodiments, the database management system automatically redirects the query to Path View 320.

In step 420, Path View is constructed based on the resource table, the link table, and the hierarchical index. In the illustrated embodiment, Path View is constructed by the path view construction process 310. In other embodiments, Path View may be a materialized view that is stored on persistent storage or produced using some other relational database object. Step 420 is described in more detail for the illustrated embodiment in a later section, with reference to FIG. 5.

In step 480, the SQL statement is optimized and executed against the Path View 320. For example, the query Q1 is optimized and executed against the contents of Path View 320 listed in Table 1, above. In some embodiments, step 480 overlaps with step 420, and Path View is constructed differently based on one or more expressions in the SQL statement. For example, when "under_path( )=1" is used in a predicate of the SQL statement, the link in the under_path expression is used as the first parent node, the root node, in the path view construction process 310. When "under_path( )=0" is used in a predicate of the SQL statement, the link in the under_Path expression is not used as a parent node, in the path view construction process 310.

In step 490, zero or more paths, node attributes, or link attributes, or some combination, is returned to the user as a result of the SQL command received in step 410, such as query Q1.

Using the steps of method 400, a user can issue a single SQL statement and receive, with efficient use of database system resources, one or more paths, or links, or link attributes, or resources, or resource attributes, or some combination, that satisfy the SQL statement.

Method for Constructing the Path View

Figure 5:
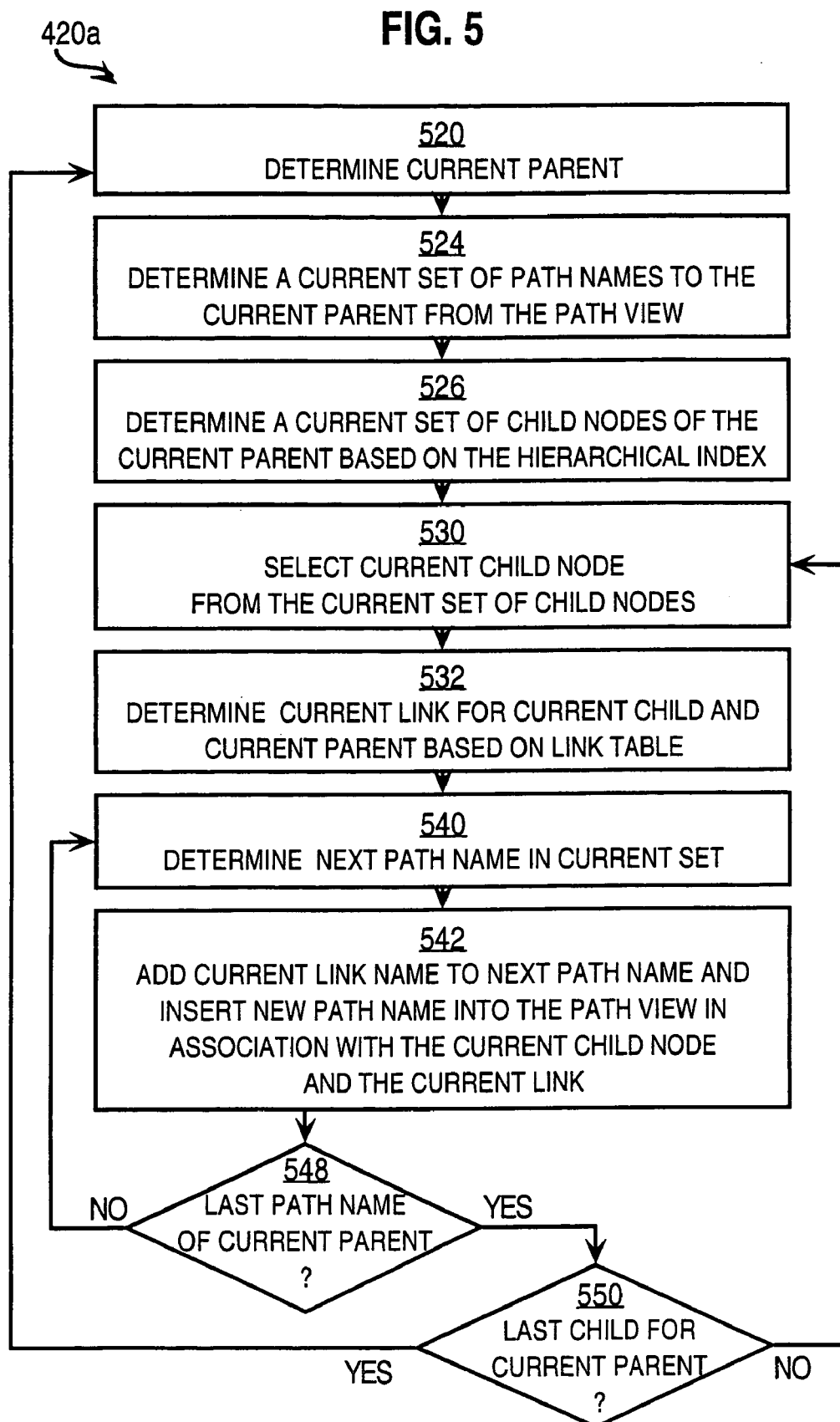
FIG. 5 is a flow diagram that illustrates a method for constructing the path view relational database object of FIG. 3, according to an embodiment; and, FIG. 6 is a block diagram that illustrates a computer system upon which an embodiment of the invention may be implemented.

FIG. 5 is a flow diagram that illustrates an embodiment 420*a* of a method for constructing the path view relational database object of FIG. 3 during step 420 of FIG. 4. In the illustrated embodiment, the Path View 320 is empty, i.e., it has no rows, at the start of method 420*a*. In some embodiments, the Path View is created with a default first row with path name "/", a null Link ID and null Link attributes, and the resource ID and resource attributes of the resource corresponding to the root node, e.g., the resource ID and resource attributes of Node 110*a*.

In step 520, a current parent node is determined. In the illustrated embodiment, the initial current parent node is the topmost node in the hierarchy to be used in Path View. For example, initially, node 110*a* is made the current parent node. In some embodiments, the topmost node is the root node of the hierarchy. In some embodiments, the topmost node is the start node of the path names. In some embodiments, the topmost node is the node named in the under_path variable in a predicate of the SQL statement.

After the initial parent node, subsequent parent nodes are made the current node in any order down from the topmost node. In some embodiments, all the nodes on one level are made the current parent node, in succession, until no nodes remain on that level. Then the nodes on the next lower level are successively made the current parent node. However, no leaf node is made a parent node. For example, the nodes of hierarchy 100 are made the current parent node in the order of 110*a*, 110*b*, 110*c*, 110*e*, 110*f*. In some embodiments, after the initial current parent node, a first child node of the current parent node is made the next current parent node. Only after a leaf node is reached is a non-leaf sibling or ancestor node made the current parent node. For example, the nodes of hierarchy 100 are made the current parent node in the order of 110*a*, 110*b*, 110*e*, 110*c*, 110*f*. In other embodiments, parent nodes are determined in other orders.

In step 524, a current set of path names to the current parent node are determined from Path View. Initially, the current set of path names has one path name with no characters in it; in some embodiments the one path name has the character "/". For subsequent parent nodes made current, the Path View contains one or more rows, such as the first few rows of Table 1.

In step 526, a current set of child nodes are determined for the current parent node based on the hierarchical index. Initially, in the illustrated embodiment, the first current set of child nodes includes only nodes 110*b*, 110*c* that are children of current parent node 110*a*.

In step 530, one of the child nodes of the current set of child nodes is selected as the current child node. Initially, in the illustrated embodiment, the first current child node is node 110*b*.

In step 532, a current link is determined for the current child node and the current parent node, based on the link table. For example, the link table shows that link 120*a* has node 110*a* as a parent node and node 110*b* as a child node. Therefore initially, in the illustrated embodiment, link 120*a* is the current link.

In step 540, the next path name in the current set of paths to the parent node is selected. Initially, in the illustrated embodiment, there is only one path with no characters, and it becomes the next path name.

In step 542, the current link name is added to the next parent path name to generate a new path name that is inserted into the Path View in association with the current link and the current child node. In the illustrated embodiment, the link name is added with a leading delimiter character "/"; thus "/L120*a*" is added to the path name with no characters and inserted into the Path View 320 in association with link 120*a* and child node 110*b*. As shown in row 1 of Table 1, the initial row entered into Path View for the illustrated embodiment has path name "/L120*a*" associated with link 120*a* (by virtue of ID120*a*) and resource 110*b* (by virtue of ID110*b*). The values of attributes of link 120*a* and resource 110*b* are also inserted into the Path View 320. For example, as shown in Table 1, "Jun. 01, 1999" is inserted for link attribute "creation_date" and "Alice" is inserted for resource attribute "owner."

In step 548, it is determined whether the last path name in the set of path names associated with the parent node has been reached. If not, control passes back to step 540 to select the next path name associated with parent and to step 542 to add the current link name to the next path. Steps 540, 542, 548 represent a loop over all the path names associated with the current parent node. If the last path name has been reached, then control passes to step 550. In the illustrated embodiment, initially there is only one path name for the parent node 110*a*, and so control passes immediately to step 550.

In step 550, it is determined whether the last child in the current set of child nodes associated with the current parent node has been reached. If not, control passes back to step 530 to select the next child node of the current parent node as the current child node and to step 532 to determine the next current link connecting the new current child node with the current parent node. Steps 530, 532 and 550 represent a loop over all the child nodes associated with the current parent node. In the illustrated embodiment, initially there are two child nodes 110*b*, 110*c* for the current parent node 110*a*, and so control passes back to steps 530 through 550 to add the link name for the second child node to the path name for the current parent node to obtain the second row in the Path View 320. The result for the illustrated embodiment is row 2 of Table 1.

As stated above, in other embodiments, the steps may be performed in a different order. For example, in other embodiments, the loop over child nodes for the current parent node (steps 530, 532, 550) may be moved inside the loop over the path names for the current parent node (steps 540, 542, 548).

If it is determined, in step 550, that the last child in the current set of child nodes associated with the current parent node has been reached, then control passes back to step 520 to pick the next parent node to serve as the current parent node. As each non-leaf child node becomes a parent node, new links are added to existing paths in the Path View 320 to generate new, longer paths in the Path View, as represented by the succeeding rows in Table 1.

Using the method of step 420*a*, the Path View 320 is generated very efficiently, even for hierarchies that include one or more cycles. In particular, the generation of the Path View 320 does not involve accessing every record in the hierarchical index for every ancestor of a resource or node of interest.

Hardware Overview

Figure 6:
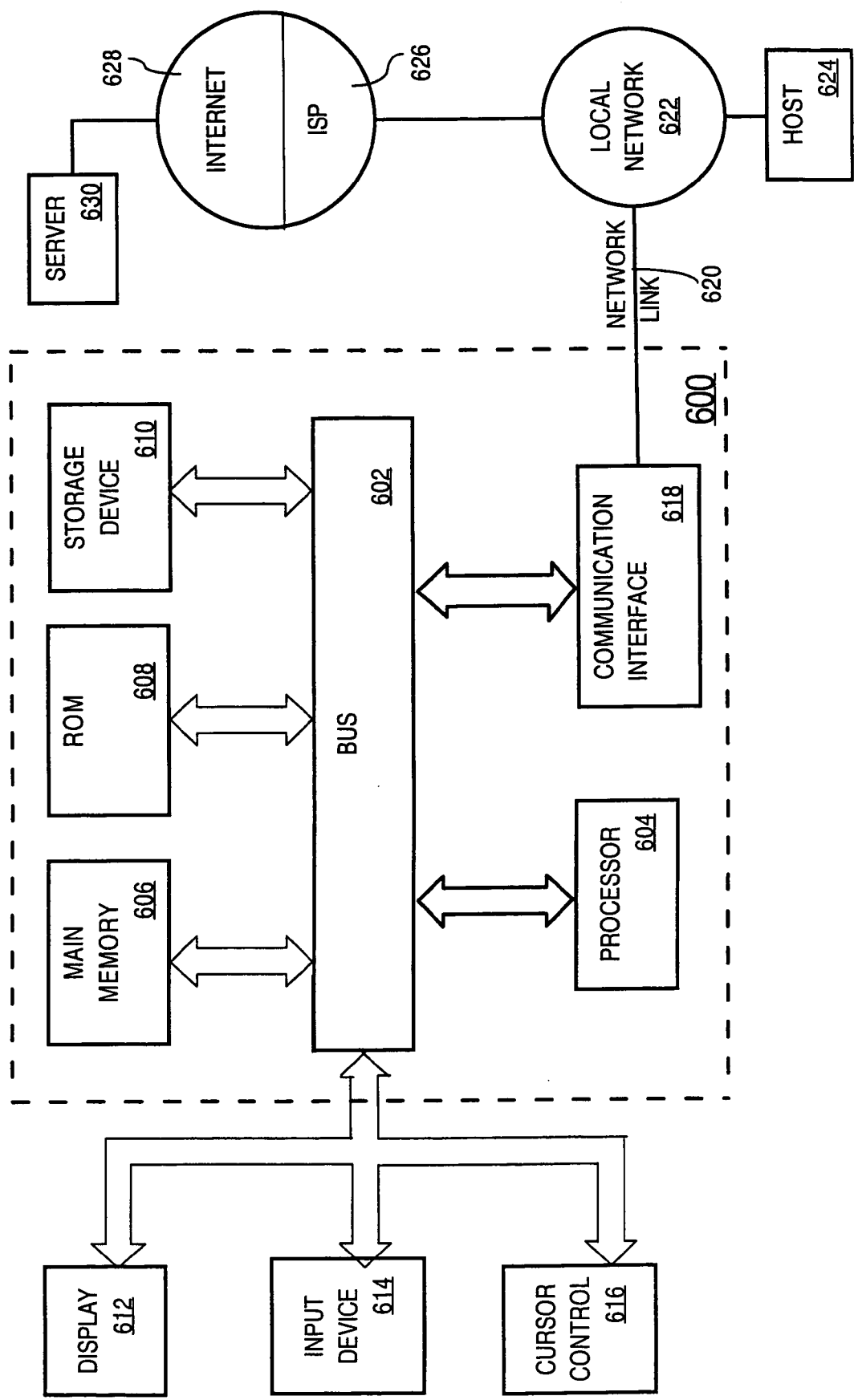

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing, in a relational database, hierarchical data about a hierarchy of nodes related by a plurality of links, the method comprising the step of:
   managing a link table which, for each link of the plurality of links, includes:
   first information that indicates a first node in the hierarchical data;
   second information that indicates a second node in the hierarchical data, wherein the second node is associated with the first node by the link; and
   link information that indicates one or more values for one or more link attributes of the link and does not indicate a value for any attribute of the first node alone or any attribute of the second node alone.

2. The method of claim 1, the method further comprising the step of managing a node table that stores values for a node attribute set of one or more node attributes for each node of a plurality of nodes in the hierarchy.

3. The method of claim 2, wherein:
   the first information comprises a reference to a row in the node table; and
   the row contains first values for the node attribute set for the first node.

4. The method of claim 2, wherein:
   the second information comprises a reference to a row in the node table; and
   the row contains second values for the node attribute set for the second node.

5. The method of claim 1, wherein:
   a node represents a resource in a file system;
   a file of a file system stores content on a computer readable-medium; and
   a resource in a file system is one of a file that is not a parent of another resource and a folder that may be a parent of another resource.

6. The method of claim 5, wherein a link comprises a parent-child relationship between a folder and a resource.

7. The method of claim 1, wherein the link information indicates at least one of a link name, a link description, a link type, a link owner, a link owner type, a link creation date, an access control policy for traversing the link to access the child node, and a procedure to invoke when traversing the link to access the child node.

8. The method of claim 1, wherein the link table indicates a cycle comprising a particular plurality of links to a particular child node by including second information that indicates the particular child node for each link of the particular plurality of links.

9. The method of claim 1, wherein:
   the method further comprises constructing a path database object describing a plurality of paths from a start node, based on the link table;
   each particular path of the plurality of paths describes a unique traversal of the hierarchy from the start node to a particular node;
   the path database object includes, for the particular path, a path name,
   node identification that indicates the particular node, and
   link identification that indicates a particular link in the link table;
   the particular link is along the particular path; and
   the second information associated with the particular link in the link table indicates the particular node.

10. The method of claim 9, wherein:
    the link information includes a link name; and
    the path name for the particular path includes a link name for every link along the path.

11. The method of claim 9, further comprising directing a relational database command to the path database object to obtain a set of one or more path names corresponding to one or more paths that satisfies a search criterion on one or more link attributes.

12. The method of claim 11, where the relational database command is a single command in a standard query language (SQL).

13. The method of claim 9, said step of constructing the path database object further comprising:
    determining a current child node linked to a current parent node; and
    for the current child node, determining a set of one or more paths leading to the current child node by determining a link in the link table that has second information that indicates the current child node and first information that indicates the current parent node.

14. The method of claim 13, said step of determining a set of one or more paths further comprising the step of adding the link to each path in a set of one or more paths leading to the current parent node.

15. The method of claim 13, wherein:
    said step of constructing the path database object further comprises determining a list of zero or more child nodes of the current parent node; and
    said step of determining the current child node comprises selecting the current child node from the list.

16. The method of claim 15, said step of determining a list of zero or more child nodes at the current parent node further comprising:
    maintaining a hierarchical index that lists the child nodes of each parent node; and
    using the index to find each child of the current parent node.

17. A computer-readable medium carrying one or more sequences of instructions for managing, in a relational database, hierarchical data about a hierarchy of nodes related by a plurality of links, wherein execution of the one or more sequences of instructions by one or more processors causes the one or more processors to perform the step of:
    managing a link table which, for each link of the plurality of links, includes:
    first information that indicates a first node in the hierarchical data;
    second information that indicates a second node in the hierarchical data, wherein the second node is associated with the first node by the link; and
    link information that indicates one or more values for one or more link attributes of the link and does not indicate a value for any attribute of the first node alone or any attribute of the second node alone.

18. The computer-readable medium of claim 17, wherein execution of the one or more sequences of instructions further causes the one or more processors to perform the step of managing a node table that stores values for a node attribute set of one or more node attributes for each node of a plurality of nodes in the hierarchy.

19. The computer-readable medium of claim 18, wherein:
    the first information comprises a reference to a row in the node table; and
    the row contains first values for the node attribute set for the first node.

20. The computer-readable medium of claim 18, wherein:
the second information comprises a reference to a row in the node table; and
the row contains second values for the node attribute set for the second node.

21. The computer-readable medium of claim 17, wherein:
a node represents a resource in a file system;
a file of a file system stores content on a computer readable-medium; and
a resource in a file system is one of a file that is not a parent of another resource and a folder that may be a parent of another resource.

22. The computer-readable medium of claim 21, wherein a link comprises a parent-child relationship between a folder and a resource.

23. The computer-readable medium of claim 17, wherein the link information indicates at least one of a link name, a link description, a link type, a link owner, a link owner type, a link creation date, an access control policy for traversing the link to access the child node, and a procedure to invoke when traversing the link to access the child node.

24. The computer-readable medium of claim 17, wherein the link table indicates a cycle comprising a particular plurality of links to a particular child node by including second information that indicates the particular child node for each link of the particular plurality of links.

25. The computer-readable medium of claim 17, wherein:
execution of the one or more sequences of instructions further causes the one or more processors to perform the step of constructing a path database object describing a plurality of paths from a root node, based on the link table;
each particular path of the plurality of paths describes a unique traversal of the hierarchy from the root node to a particular node;
the path database object includes, for the particular path, a path name,
node identification that indicates the particular node, and
link identification that indicates a particular link in the link table;
the particular link is along the particular path; and
the second information associated with the particular link in the link table indicates the particular node.

26. The computer-readable medium of claim 25, wherein:
the link information includes a link name; and
the path name for the particular path includes a link name for every link along the path.

27. The computer-readable medium of claim 25, wherein execution of the one or more sequences of instructions further causes the one or more processors to perform the step of receiving a relational database command directed to the path database object to obtain a set of one or more path names corresponding to one or more paths that satisfies a search criterion on one or more link attributes.

28. The computer-readable medium of claim 27, where the relational database command is a single statement in a standard query language (SQL).

29. The computer-readable medium of claim 25, said step of constructing the path database object further comprising the steps of:
determining a current child node linked to a current parent node; and
for the current child node, determining a set of one or more paths leading to the current child node by determining a link in the link table that has second information that indicates the current child node and first information that indicates the current parent node.

30. The computer-readable medium of claim 29, said step of determining a set of one or more paths further comprising the step of adding the link to each path in a set of one or more paths leading to the current parent node.

31. The computer-readable medium of claim 29, wherein:
said step of constructing the path database object further comprises determining a list of zero or more child nodes of the current parent node; and
said step of determining the current child node comprises selecting the current child node from the list.

32. The computer-readable medium of claim 31, said step of determining a list of zero or more child nodes at the current parent node further comprising:
maintaining a hierarchical index that lists the child nodes of each parent node; and
using the index to find each child of the current parent node.

* * * * *